(12) United States Patent
Yu et al.

(10) Patent No.: US 9,122,944 B2
(45) Date of Patent: Sep. 1, 2015

(54) PAPER MEDIUM IDENTIFYING DEVICE AND IDENTIFYING METHOD

(71) Applicants: Yuanchao Yu, Guangdong (CN); Tiancai Liang, Guangdong (CN); Dingxi Chen, Guangdong (CN); Kun Wang, Guangdong (CN)

(72) Inventors: Yuanchao Yu, Guangdong (CN); Tiancai Liang, Guangdong (CN); Dingxi Chen, Guangdong (CN); Kun Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 44 days.

(21) Appl. No.: 14/233,657

(22) PCT Filed: Oct. 26, 2012

(86) PCT No.: PCT/CN2012/083594
§ 371 (c)(1),
(2) Date: Jan. 17, 2014

(87) PCT Pub. No.: WO2013/127186
PCT Pub. Date: Sep. 6, 2013

(65) Prior Publication Data
US 2014/0126803 A1 May 8, 2014

(30) Foreign Application Priority Data
Feb. 28, 2012 (CN) .......................... 2012 1 0049059

(51) Int. Cl.
*G06K 9/00* (2006.01)
*G06K 9/18* (2006.01)
(Continued)

(52) U.S. Cl.
CPC ............... *G06K 9/18* (2013.01); *G07D 7/2058* (2013.01); *G07D 7/2075* (2013.01); *H04N 1/387* (2013.01); *H04N 1/4097* (2013.01)

(58) Field of Classification Search
USPC ......................................................... 382/135
See application file for complete search history.

(56) References Cited

U.S. PATENT DOCUMENTS

| 6,573,983 | B1 * | 6/2003 | Laskowski | ...................... 356/71 |
| 8,406,527 | B2 * | 3/2013 | Kido | ............................ 382/193 |
| 2006/0263101 | A1 | 11/2006 | Takamatsu et al. | |

FOREIGN PATENT DOCUMENTS

| CN | 1196633 A | 3/2004 |
| JP | 09073573 A | 3/1997 |

(Continued)

OTHER PUBLICATIONS

Zhang, Dongjiao et al. *Research on RMB Currency Number Identification System Based on Template Matching*, Computer & Digital Engineering, Jan. 2012, vol. 40, No. 1, pp. 104-108, ISSN 1672-9722.

(Continued)

*Primary Examiner* — Yon Couso
(74) *Attorney, Agent, or Firm* — Wolf, Greenfield & Sacks, P.C.

(57) ABSTRACT

A paper medium identifying device and an identifying method. The paper medium identifying device comprises an image data obtaining unit, a faulty wire detecting unit, an image dividing unit, a standard template data storage unit, a comprehensive analyzing unit, a new template generating unit and a judging unit. The paper medium identifying device divides the standard template into new sub-templates by dividing the template from a faulty wire position as margin, and then matches the sub-templates with a papery medium image which being identified so as to avoid the influence of faulty wires on the template match identification and improve the acceptance rate of the papery medium identifying device.

7 Claims, 6 Drawing Sheets

| (51) | Int. Cl. | | JP | 2003006697 A | 1/2003 |
| --- | --- | --- | --- | --- | --- |
| | *H04N 1/387* | (2006.01) | JP | 1774730 | 5/2006 |
| | *G07D 7/20* | (2006.01) | WO | WO 2006003212 A | 1/2006 |
| | *H04N 1/409* | (2006.01) | WO | WO 2009037791 A1 | 3/2009 |

(56) References Cited

OTHER PUBLICATIONS

FOREIGN PATENT DOCUMENTS

International Search Report dated Jan. 24, 2013 from corresponding International Application No. PCT/CN2012/083594.

JP  09231438 A  9/1997

\* cited by examiner read the original template from the left to the right, and turn to the next row upon the faulty line obtain a new template

PAPER MEDIUM IDENTIFYING DEVICE AND IDENTIFYING METHOD

This application is the U.S. National Stage of international patent application number PCT/CN2012/083594, filed on Oct. 26, 2012 which claims the priority of Chinese Patent Application No. 201210049059.0, entitled "DEVICE AND METHOD FOR IDENTIFYING PAPER MEDIUM", filed with the Chinese State Intellectual Property Office on Feb. 28, 2012, which applications are hereby incorporated by reference to the maximum extent allowable by law.

FIELD OF THE INVENTION

The invention relates to a technique for identifying a paper medium, and particularly to a device and method for identifying a paper medium such as paper currency.

BACKGROUND OF THE INVENTION

An automated teller machine (ATM) in financial institution is mounted with a device for identifying a paper medium (such as paper currency). Template data for identifying a paper medium is stored in a storage part of the device for identifying the paper medium. Once the paper medium is loaded into the device for identifying the paper medium, an image data acquiring part of the device for identifying the paper medium is configured to read the paper medium optically, acquire grayscale image data of the paper medium to be identified, perform a match between the template and a detection result based on the obtained pattern and grayscale value of the grayscale image of the paper medium to be identified, and thus determine a kind and authenticity of the paper medium (currency).

If the device for identifying the paper medium has been used for a long time, a fault may occur in a certain light emitting element of the contact image sensor (CIS), or a transparent piece of the CIS may be dirty. Because the CIS performs a line scan, a black line with gray value approximate to 0 will occur on the reflected image or transmitted image acquired by the image sensor (which black line is referred to as "faulty line" hereinafter, and this case is referred to as "CIS faulty line phenomenon"), when a fault occurs in a certain light emitting element of the CIS or the transparent piece of the CIS is dirty. The position of a faulty light emitting element or dirty transparent piece of the CIS is random, so the position of the faulty line in the image of the paper medium to be detected is random. In this case, if the existing identification processes are performed, the acceptance rate of the device for identifying the paper medium will be decreased, the performance of the device and the customer experience will be affected significantly, and thus the marketing and application of the device will be obstructed.

Thus, it is necessary to propose a technique for effectively solving the problem of the CIS faulty line in the device for identifying the paper medium.

SUMMARY OF THE INVENTION

One of the objects of the invention is to provide a device for identifying a paper to medium, for effectively solving the problem of a CIS faulty line and improving the acceptance rate significantly.

A device and method for identifying a paper medium is further provided according to an embodiment of the invention.

A device for identifying a paper medium includes:

an image data acquiring part for acquiring original image data of the paper medium;

a faulty line detecting part for detecting whether there is a faulty line in the original image data of the paper medium obtained by the image data acquiring part, and obtaining a position of the faulty line if there is the faulty line in the original image data of the paper medium;

an image cutting part for cutting the original image data to obtain complete image information and identification image information of an effectively identified paper medium;

a standard template data storage part for storing a standard template for identifying the paper medium;

a comprehensive analysis part for comprehensively analyzing the complete image information of the paper medium, a result from the faulty line detecting part and data information of a standard template to determine whether the faulty line at a current position has influences template match identification;

a new template generating part for cutting the standard template into new sub-templates by taking the faulty line as a boundary based on an analysis result from the comprehensive analysis part in the case that the faulty line influences the template match identification, and performing no process on the standard template in the case that the faulty line does not influence the template match identification; and a determining part for performing the template match identification on the identification image information of the paper medium by using the generated sub-templates and the template that is not influenced by the faulty line, to obtain an identification result.

Preferably, the image cutting part is further configured to cut the identification image to information with the faulty line based on the faulty line, so as to form identification sub-image information.

Further, the determining part is further configured to perform the template match identification between the identification sub-image information formed by the identification image information with the faulty line and the sub-template formed by the new template generating part to obtain an identification result.

The method for identifying the paper medium includes the following steps:

step 1, loading a paper medium to be identified, the paper medium entering into a transfer passage, and a process beginning;

step 2, scanning, by an image sensor, an image of the paper medium when the paper medium passes through a transfer passage, so as to form an original image;

step 3, setting, by a faulty line detecting part, the original image obtained by the image sensor in a coordinate system, and detecting whether there is a faulty line in the original image; the process going to step 4 if there is no faulty line in the original image, and further determining a position of the faulty line in the coordinate system if there is a faulty line in the original image;

step 4, cutting original image data to obtain complete image information and identification image information of the paper medium;

step 5, setting, by a comprehensive analysis part, the complete image information in a new coordinate system, determining a position of the faulty line in the new coordinate system, detecting whether the faulty line at a current position influences a template match identification according to data information of a standard template in a standard template data storage part, cutting a template that is influenced by the faulty line by taking the current faulty line as a boundary to generate a new sub-template, and performing no process on the standard template that is not influenced by the faulty line; and step 6, performing the template match identification on the identification image information of the loaded paper medium by using the newly generated sub-template and the to template that is not influenced by the faulty line to obtain an identification result, and ending the process.

A method for detecting whether there is a faulty line in the original image in the step 3 is as follow:

assuming that:

(1) a grayscale value matrix of a reflected image has $x_0$ columns and $y_0$ rows;

(2) a grayscale value at a position of the yth row and the xth column in the reflected image is indicated by $g(x, y)$; and (3) an average grayscale value of the xth column in the reflected image is indicated by $\tilde{g}(x)$;

in accordance with a constraint condition of:

$$\begin{cases} g(x, y) < \varepsilon_1, (0 < y < y_0); \\ \overline{g}(x) < \varepsilon_2, (0 < y < y_0); \\ |\overline{g}(x-1) - \overline{g}(x)| > \varepsilon_3; \\ |\overline{g}(x+1) - \overline{g}(x)| > \varepsilon_4; \end{cases}$$ (each of $\varepsilon_1, \varepsilon_2, \varepsilon_3$ and $\varepsilon_4$ is larger than 0, and is a preset threshold value), an automatic search and detection is performed on an image grayscale matrix obtained by the image sensor; if the above constraint condition is met at a column of $x=n_0$, that is, the $n_0$th column in the image grayscale matrix, it is determined that there is a faulty line in the image; else, it is determined that there is no faulty line in the image.

A method for determining the position of the faulty line in the coordinate system xOy in the step 3 is as follow:

assuming that in a complete image of the paper medium, an upper left vertex is set as A, a lower left vertex is set as B, an upper right vertex is set as D and a lower right vertex is set as C, and the faulty line intersects with an upper boundary and a lower boundary of the to complete image of the paper medium at points E and F respectively, upper, lower, left and right boundary points of the complete image of the paper medium are detected, and a linear fit is performed for each of the obtained boundary points to obtain:

an upper boundary linear equation of: $a_1x+b_1y+c_1=0$,
a lower boundary linear equation of: $a_2x+b_2y+c_2=0$,
a left boundary linear equation of: $a_3x+b_3y+c_3=0$, and
a right boundary linear equation of: $a_4x+b_4y+c_4=0$;

by solving:

$$\begin{cases} a_1x + b_1y + c_1 = 0 \\ a_3x + b_3y + c_3 = 0 \end{cases}$$

a coordinate of the upper left vertex A in the coordinate system xOy can be obtained, which is indicated by $A(x_a, y_a)$;

by solving:

$$\begin{cases} a_2x + b_2y + c_2 = 0 \\ a_3x + b_3y + c_3 = 0 \end{cases}$$

a coordinate of the lower left vertex B in the coordinate system xOy can be obtained, which is indicated by $B(x_b, y_b)$; and by solving:

$$\begin{cases} a_1x + b_1y + c_1 = 0 \\ x = n_0 \end{cases} \text{ and } \begin{cases} a_2x + b_2y + c_2 = 0 \\ x = n_0 \end{cases},$$

coordinates of the points E and F in the coordinate system xOy can be obtained, which are indicated by $E(x_e, y_e)$ and $F(x_f, y_f)$ respectively, resulting that:

$$d_{AB} = \sqrt{(y_b - y_a)^2 + (x_b - x_a)^2},$$

$$d_{AE} = \sqrt{(y_e - y_a)^2 + (x_e - x_a)^2}, \text{ and}$$

$$d_{BF} = \sqrt{(y_f - y_b)^2 + (x_f - x_b)^2}.$$

A method for determining the position of the faulty line in the coordinate system x'O'y' in the step 5 is as follow:

the coordinate system x'O'y' is established by taking the upper left vertex A as an origin, taking an extension direction of the upper boundary as the x axis, and taking a direction in which the left boundary extends as the y axis, and the coordinates of the points A, E and F are respectively:

$O'=A=(0,0),$ $E=(d_{AE},0),$ and $F=(d_{BF},d_{AB});$ and a linear equation of the faulty line EF in the coordinate system x'O'y' is:

$$y' = \frac{d_{AB}}{d_{BF} - d_{AE}}x' + \frac{d_{AB} \cdot d_{AE}}{d_{AE} - d_{BF}}.$$

According to the invention, the method for cutting the template by taking the position of the faulty line as the boundary is adapted to generate a new sub-template from the standard template, and then a template match identification is performed between the newly generated sub-template and the identification image information of the paper medium to be identified, so that the influence of the faulty line on the template match identification is avoided, and the acceptance rate of the device for identifying the paper medium is improved.

DETAILED DESCRIPTION OF THE INVENTION

Specific embodiments of the invention will be described hereinafter in conjunction with appended drawings, in order to further illustrate the invention.

Figure 1:
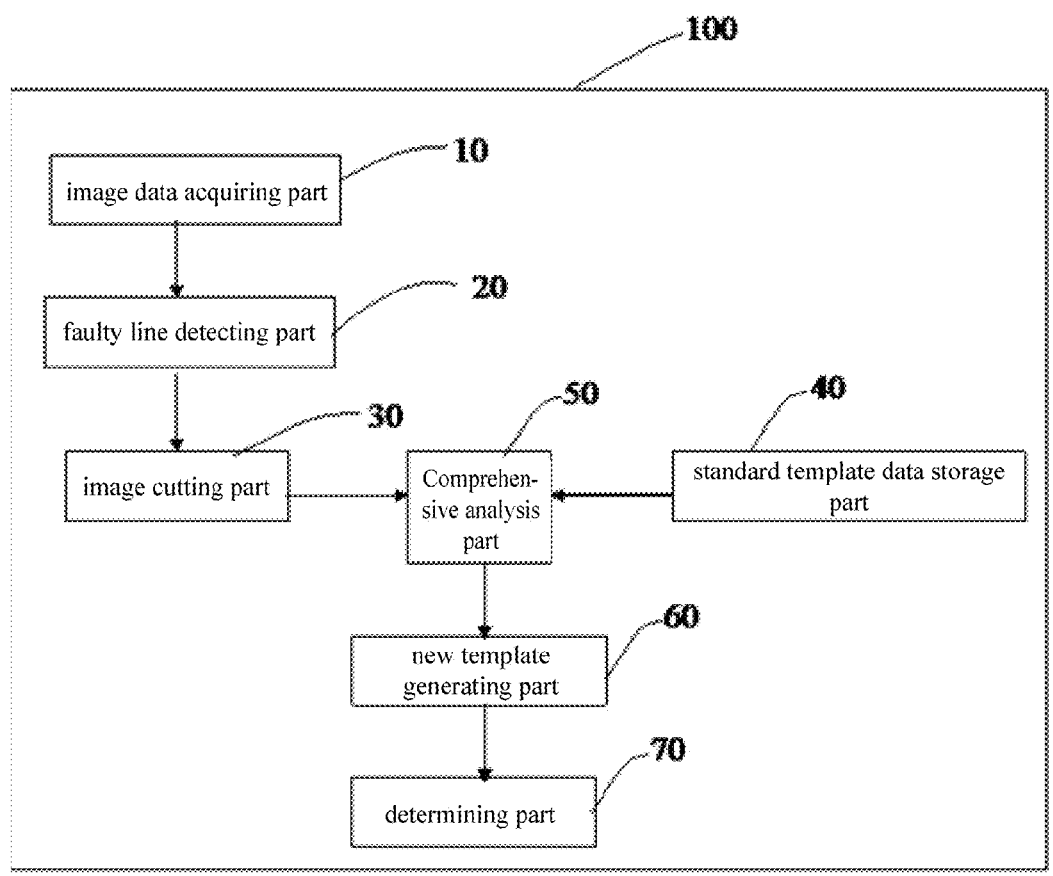
FIG. 1 is a block diagram of a structure of a device for identifying a paper medium according to a preferred embodiment of the invention.

FIG. 1 is a block diagram of a structure of a device for identifying a paper medium 100 according to a preferred embodiment of the invention. The device 100 for identifying the paper medium is embedded in a device for processing the paper medium such as ATM (automated teller machine), and transports, through a transfer passage, the paper medium to be identified (such as paper currency) one by one into an image data acquiring part. The device for identifying the paper medium 100 includes an image data acquiring part 10, a faulty line detecting part 20, an image cutting part 30, a standard template data storage part 40, a comprehensive analysis part 50, a new template generating part 60 and a determining part 70. The image data acquiring part 10 is configured to acquire original image data of the paper medium; the faulty line detecting part 20 is configured to detect whether there is a faulty line in the original image data of the paper medium obtained by the image data acquiring part, and determine a position of the faulty line if there is the faulty line; the image cutting part 30 is configured to cut the original image data to obtain complete image information and identification image information of the effectively identified paper medium; the standard template data storage part 40 is configured to store a standard template which is necessary for identifying the paper medium; the comprehensive analysis part 50 is configured to comprehensively analyzing the complete image information of the paper medium, a result from the faulty line detecting part and data information of the standard template, and determine whether the faulty line at a current position has influence on the template match identification; the new template generating part 60 is configured to, based on an analysis result from the comprehensive analysis part, cutting the original standard template into new sub-templates by taking the faulty line as a boundary in the case that the faulty line has influence on the template to match identification, and performing no process on the original standard template when the faulty line has no influence on the template match identification; and the determining part 70 is configured to perform the template match identification on the identification image information of the paper medium by using the newly generated sub-templates and the original standard template that is not influenced by the faulty line, to obtain an identification result. Specifically, the image cutting part 30 is further configured to cut the identification image information with the faulty line along the faulty line, so as to form identification sub-image information, and the determining part 70 is further configured to perform the template match identification respectively between the identification sub-image information formed by the identification image information with the faulty line and the corresponding sub-template formed by the new template generating part, to obtain an identification result.

Figure 2:
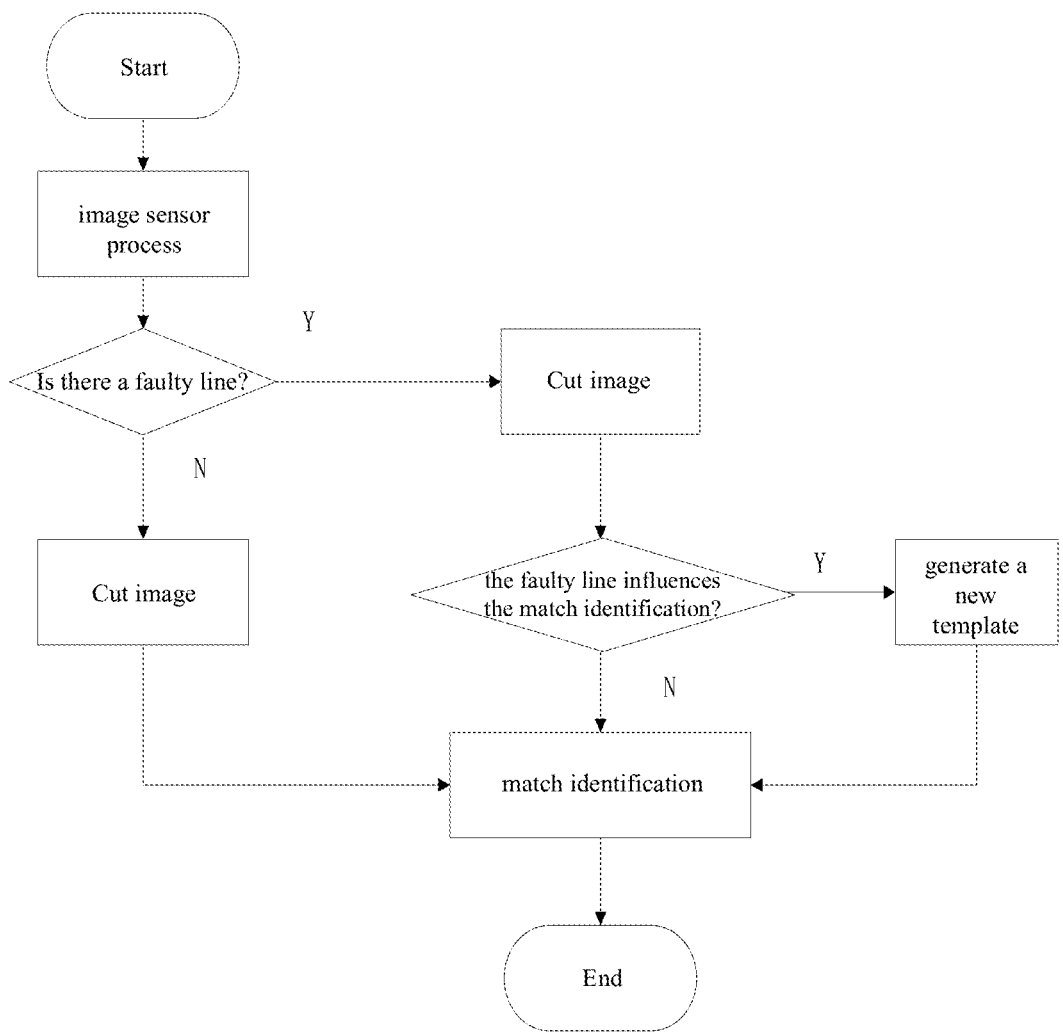
FIG. 2 is a flowchart of a method for identifying a paper medium according to a preferred embodiment of the invention.

FIG. 2 is a flowchart of a method for identifying a paper medium by the device 100 for identifying the paper medium. The method includes the following steps: step 1, loading a paper medium to be identified, the paper medium entering into a transfer passage, and a process beginning; step 2, scanning, by an image sensor, an image of the paper medium when the paper medium passes through the transfer passage, so as to form an original image; step 3, setting, by a faulty line detecting part, the original image obtained by the image sensor in a coordinate system, detecting whether there is a faulty line in the original image, going to step 4 if there is no faulty line in the original image, and further determining a position of the faulty line in the coordinate system if there is the faulty line in the original image; step 4, cutting the original image data to obtain complete image information and identification image information of the paper medium; step 5, setting, by a comprehensive analysis part, the complete image information in a new coordinate system, determining a position of the faulty line in the new coordinate system, detecting whether the faulty line at a current position has influence on a template match identification according to standard template data information in a standard template data storage part, cutting a template that is influenced by the faulty line by taking the current faulty line as a boundary to generate a new sub-template, and performing no process on the template that is not influenced by the faulty line; and step 6, performing the template match identification on the identification image information of the loaded paper medium by using the newly generated sub-template and the template that is not influenced by the faulty line to obtain an identification result, and ending the process.

The image data acquiring part 10 includes a transmissive sensor for detecting a transmitted image and/or a reflective sensor for detecting a reflected image. When the paper medium is transferred through the transfer passage, the image data acquiring part 10 acquires the transmitted image and/or the reflected image of the paper medium, and transfers the obtained transmitted image and/or reflected image to the faulty line detecting part 20.

Figure 3:
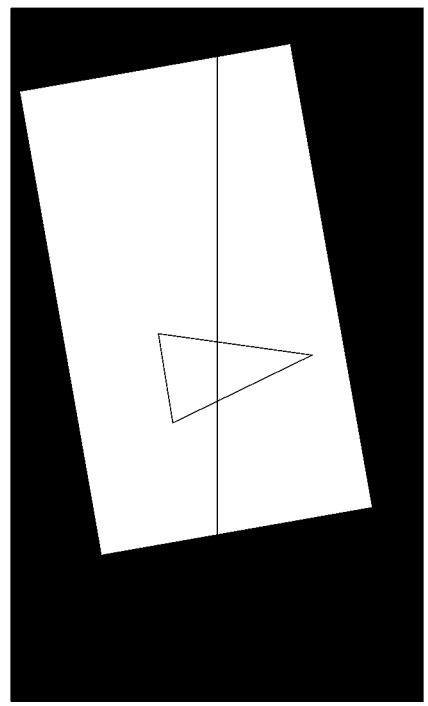
FIG. 3 is a schematic diagram of an image obtained by an image sensor when a CIS detects a faulty line.

The faulty line detecting part 20 detects whether there is a faulty line in the original image obtained by the image sensor at first, and accurately obtains the position of the faulty line in the whole image in the case that there is the faulty line in the original image of the loaded paper medium. Because the image is obtain by CIS in the rectilinear scanning, a black line with the grayscale value approximate to 0 occurs on the original image of the paper medium to be detected if there is any faulty line in the image. Because the position of the CIS faulty line has non-determinacy, the position of the faulty line in the original image of the paper medium to be detected also has non-determinacy. Assuming that when the faulty line (one faulty line) is detected by the CIS, the image obtained by the image sensor is shown as FIG. 3.

Figure 4:
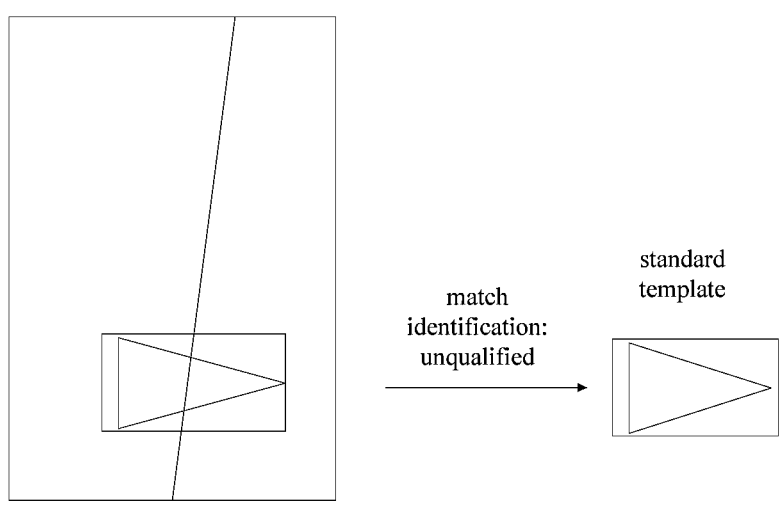
FIG. 4 is a schematic diagram of match between an image obtained by an image sensor and a standard template when a faulty line is not repaired.

If the image cutting and template match identification are performed directly without processing the faulty line region, the match can not be successful when the faulty line is exactly in a certain region on which the template match identification is to be performed, as shown in FIG. 4. The identification of the paper medium to be detected will fail, and thus a normal paper medium will be refuse by the financial self-service device (such as ATM) finally.

Figure 5:
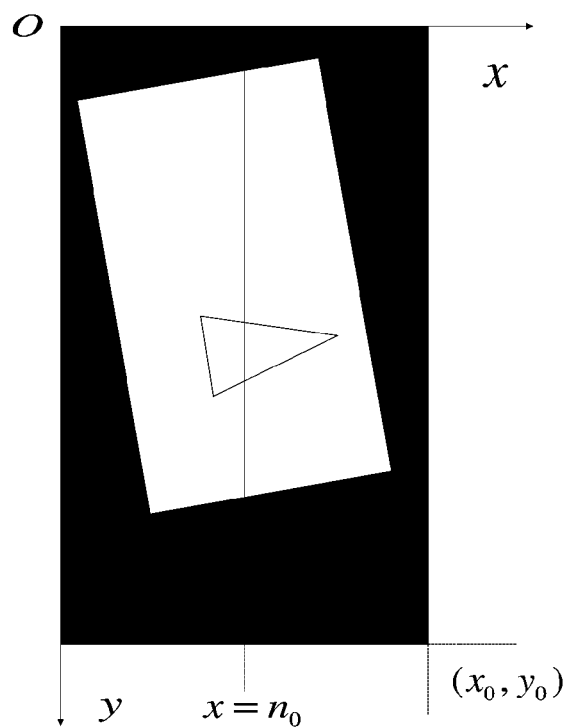
FIG. 5 is a schematic diagram of an image obtained by an image sensor and to be performed a faulty line repair according to a preferred embodiment of the invention, in which the image is set in a coordinate system xOy.

In this embodiment, the faulty line is detected by using the reflected image of the loaded paper medium that is obtained by the reflective sensor. The reflected image of the loaded paper medium is set in the coordinate system xOy, as shown in FIG. 5.

Assuming that:

(1) a grayscale value matrix of a reflected image has $x_0$ columns and $y_0$ rows;

(2) a grayscale value on a position of the yth row and the xth column in the reflected image is indicated by $g(x, y)$; and (3) an average grayscale value of the xth column in the reflected image is indicated by $\tilde{g}(x)$, in accordance with a constraint condition of:

$$\begin{cases} g(x, y) < \varepsilon_1, (0 < y < y_0); \\ \tilde{g}(x) < \varepsilon_2, (0 < y < y_0); \\ |\tilde{g}(x-1) - \tilde{g}(x)| > \varepsilon_3; \\ |\tilde{g}(x+1) - \tilde{g}(x)| > \varepsilon_4; \end{cases} \quad \text{(each of } \varepsilon_1, \varepsilon_2, \varepsilon_3 \text{ and } \varepsilon_4 \text{ is larger than 0, and is a preset threshold value),} \quad (1.1)$$

for example, assuming that $\varepsilon_1=20$, $\varepsilon_2=20$, $\varepsilon_3=80$ and $\varepsilon_4=80$, automatic search and detection is performed on the grayscale value matrix of the reflected image obtained by the image sensor.

If there is no column x that meets the constraint condition (formula 1.1) by traversing the grayscale value matrix of the reflected image, it is determined that there is no faulty line in the reflected image obtained by the image sensor, and thus it can be deduced that there is no CIS faulty line in the device for identifying the paper medium. The process directly performs the step of cutting the complete image of the paper medium to be identified, and the template match identification is performed on the complete image of the paper medium obtained by cutting finally, to obtain a final identification result.

The image grayscale value matrix of the reflected image has a column of $$x=n_0,$$

that is, the $n_0$th column of the image grayscale value matrix meets the above constraint condition (formula 1.1), and thus it is determined that there is the faulty line in the reflected image, i.e., the CIS faulty line phenomena in the device for identifying the paper to medium, and that the faulty line is located at the $n_0$th column in the grayscale image obtained by the image sensor. Then, the image cutting process is processed.

Figure 6:
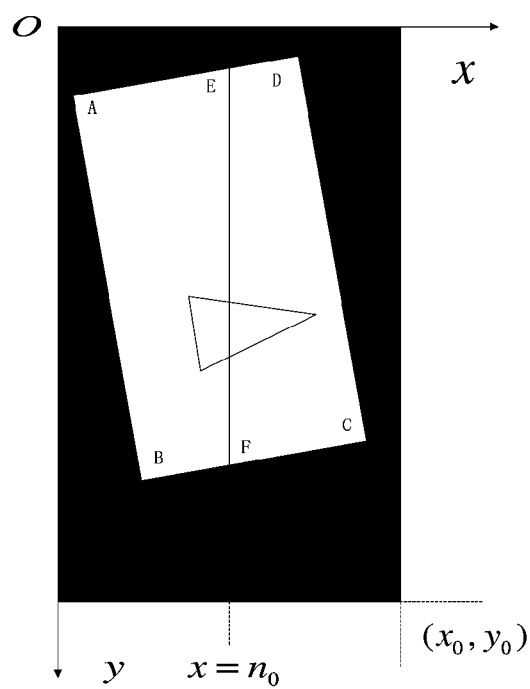
FIG. 6 is a schematic diagram of an image obtaining by an image sensor, in which the image is set in a coordinate system xOy and respective boundary points are set for determining a position of a faulty line.

In the coordinate system xOy, it is assumed that in the complete image of the paper medium, an upper left vertex is set as A, a lower left vertex is set as B, an upper right vertex is set as D and a lower right vertex is set as C, and the faulty line intersects with an upper boundary and a lower boundary of the complete image of the paper medium at points E and F respectively, as shown in FIG. 6. The upper, lower, left and right boundary points of the complete image of the paper medium are detected, and the obtained boundary points are linearly fitted respectively to obtain:

an upper boundary linear equation of: $a_1x+b_1y+c_1=0$,
a lower boundary linear equation of: $a_2x+b_2y+c_2=0$,
a left boundary linear equation of: $a_3x+b_3y+c_3=0$, and
a right boundary linear equation of: $a_4x+b_4y+c_4=0$.

By solving:

$$\begin{cases} a_1x + b_1y + c_1 = 0 \\ a_3x + b_3y + c_3 = 0 \end{cases},$$

a coordinate of the upper left vertex A in the coordinate system xOy can be obtained, which is indicated by $A(x_a, y_a)$.

By solving:

$$\begin{cases} a_2x + b_2y + c_2 = 0 \\ a_3x + b_3y + c_3 = 0 \end{cases},$$

a coordinate of the lower left vertex B in the coordinate system xOy can be obtained, which is indicated by $B(x_b, y_b)$.

By solving:

$$\begin{cases} a_1x + b_1y + c_1 = 0 \\ x = n_0 \end{cases} \text{ and } \begin{cases} a_2x + b_2y + c_2 = 0 \\ x = n_0 \end{cases},$$

coordinates of the points E and F in the coordinate system xOy can be obtained, which are indicated by $E(x_e, y_e)$ and $F(x_f, y_f)$ respectively.

Based on the above, the result can be calculated:

$$d_{AB} = \sqrt{(y_b - y_a)^2 + (x_b - x_a)^2},$$

$$d_{AE} = \sqrt{(y_e - y_a)^2 + (x_e - x_a)^2}, \text{ and}$$

$$d_{BF} = \sqrt{(y_f - y_b)^2 + (x_f - x_b)^2}.$$

Figure 7:
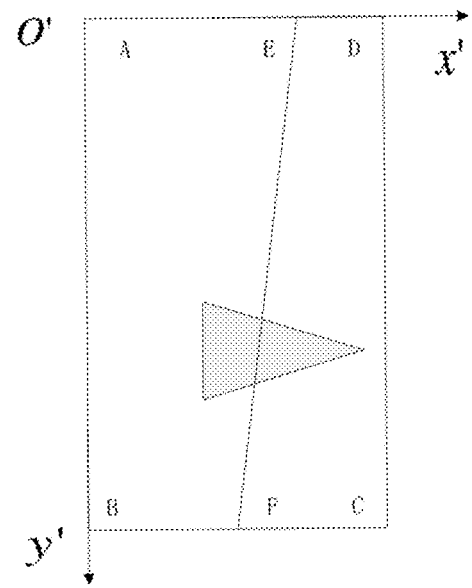
FIG. 7 is a schematic diagram of an image obtaining by an image sensor, in which the image is set in a coordinate system x'O'y' and a position of a faulty line in the coordinate system x'O'y' is determined.

The coordinate system x'O'y' is established by taking the upper left vertex A as an origin, taking an extension direction of the upper boundary as the x axis, and taking an extension direction of the left boundary as the y axis, as shown in FIG. 7, and the coordinates of the points A, E and F are respectively:

$$O'=A=(0,0),$$

$$E=(d_{AE},0), \text{ and}$$

$$F=(d_{BF},d_{AB}).$$

Thus, the linear equation of the faulty line EF in the coordinate system x'O'y' is:

$$y' = \frac{d_{AB}}{d_{BF} - d_{AE}} x' + \frac{d_{AB} \cdot d_{AE}}{d_{AE} - d_{BF}}. \quad (1.2)$$

Figure 8:
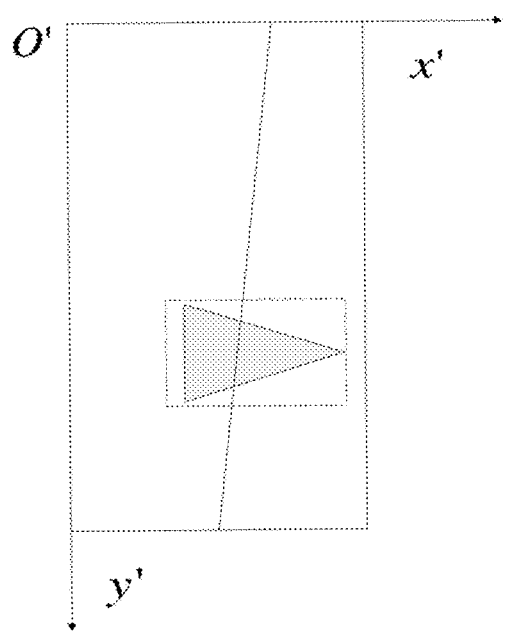
FIG. 8 is a schematic diagram of a position of a faulty line, in which the faulty line is located at a region to be matched.

Based on the position of the faulty line in the coordinate system x'O'y' (formula 1.2) and the standard template information stored in the standard template data storage part, the comprehensive analysis part detects whether there is a region to be matched that is influenced by the faulty line. If the faulty line has no influence on any of the regions to be matched (that is, the faulty line does not pass through any of the regions to be matched), the match to identification is performed directly without any other process. If the faulty line is exactly located in a certain region to be matched, as shown in FIG. 8, the template corresponding to this region is divided into two sub-templates by taking the faulty line as the boundary.

Figure 9:
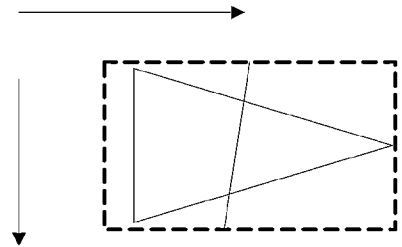
FIG. 9 is a schematic diagram of a new template obtained by cutting an existing template along a faulty line as a boundary line.
Figure 9:
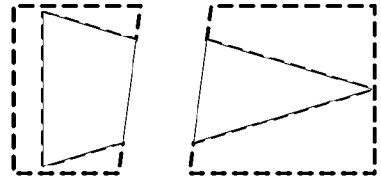

The method for generating the sub-template is shown in FIG. 9. The standard template data is read from the left to the right, and the reading process turns to the next row of data when the faulty line EF is read. In this way, the new template is obtained by cutting the existing template along the faulty line as the boundary.

Figure 10:
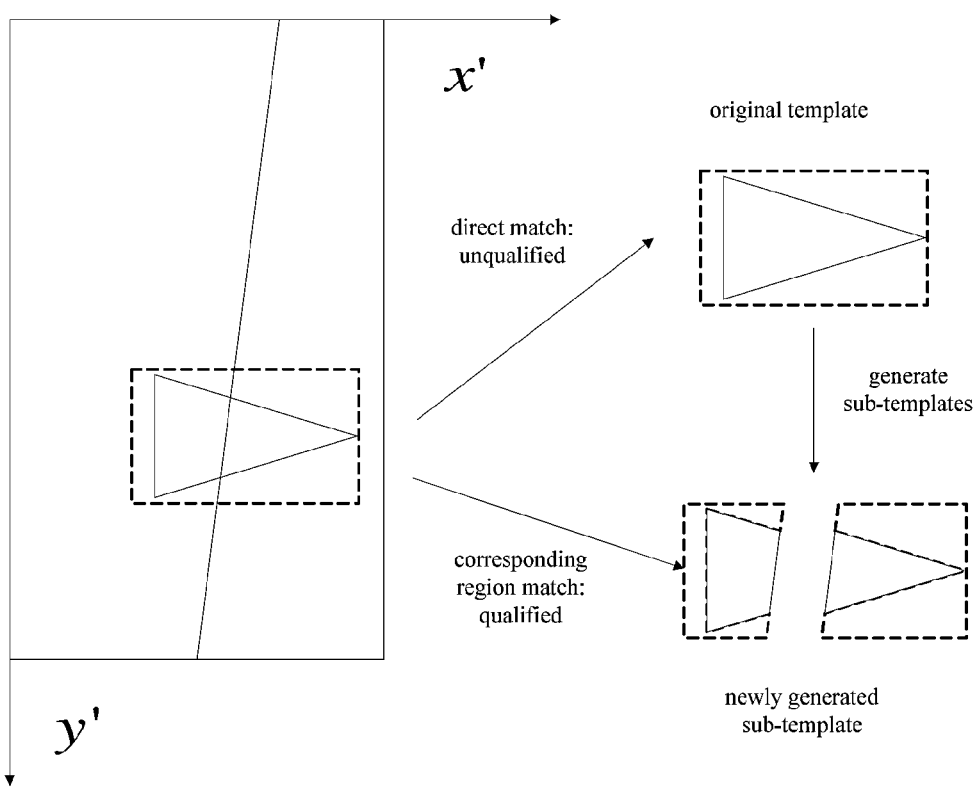
FIG. 10 is a schematic diagram of a template match identification between a newly generated template and a template that is not influenced by the faulty line and an image to obtained by an image sensor.

Finally, the match identification is obtained by using the newly generated template and the template that is not influenced by the faulty line, to achieve the identification of the loaded paper medium, as shown in FIG. 10.

According to the invention, with the method for cutting the template by taking the position of the faulty line as the boundary, a new sub-template is generated based on the standard template, and the template match identification is performed between the newly generated sub-template and the image of the paper medium to be identified, so that the influence of the faulty line on the template match identification is avoided, and the acceptance rate of the device for identifying the paper medium is improved.

The above are only preferred embodiments of the invention, and it is to be noted that the above preferred embodiments should not be interpreted as to limit the invention, and the scope of protection of the invention should be subject to the scope defined in the appended claims. Several modifications and variations can be made by those skilled in the art without deviating from the spirit and scope of the invention, which also fall within the scope of protection of the invention.

The invention claimed is:

1. A device for identifying a paper medium, comprising:
an image data acquiring part for acquiring original image data of the paper medium;
a faulty line detecting part for detecting whether there is a faulty line in the original image data of the paper medium obtained by the image data acquiring part, and obtaining a position of the faulty line if there is the faulty line in the original image data of the paper medium;
an image cutting part for cutting the original image data to obtain complete image information and identification image information of an effectively identified paper medium;
a standard template data storage part for storing a standard template for identifying the paper medium;
a comprehensive analysis part for comprehensively analyzing the complete image information of the paper medium, a result from the faulty line detecting part and data information of the standard template to determine whether the faulty line at a current position influences template match identification;
a new template generating part for cutting the standard template into new sub-templates by taking the faulty line as a boundary based on an analysis result from the comprehensive analysis part in the case that the faulty line influences the template match identification, and performing no process on the standard template in the case that the faulty line does not influence the template match identification; and
a determining part for performing the template match identification on the identification image information of the paper medium by using the newly generated sub-templates and the standard template that is not influenced by the faulty line, to obtain an identification result.

2. The device for identifying the paper medium according to claim 1, wherein the image cutting part is further configured to cut the identification image information with the faulty line based on the faulty line, so as to form identification sub-image information.

3. The device for identifying the paper medium according to claim 2, wherein the determining part is further configured to perform the template match identification respectively between the identification sub-image information formed by the identification image information with the faulty line and the sub-template formed by the new template generating part to obtain an identification result.

4. A method for identifying a paper medium, comprising:
step 1, loading a paper medium to be identified, the paper medium entering into a to transfer passage, and a process beginning;
step 2, scanning, by an image sensor, an image of the paper medium when the paper medium passes through a transfer passage, so as to form an original image;
step 3, setting, by a faulty line detecting part, the original image obtained by the image sensor in a coordinate system, and detecting whether there is a faulty line in the original image;
the process going to step 4 if there is no faulty line in the original image, and further determining a position of the faulty line in the coordinate system if there is the faulty line in the original image;
step 4, cutting original image data to obtain complete image information and identification image information of the paper medium;
step 5, setting, by a comprehensive analysis part, the complete image information in a new coordinate system, determining a position of the faulty line in the new coordinate system, detecting whether the faulty line at a current position influences a template match identification according to data information of a standard template in a standard template data storage part, cutting a template that is influenced by the faulty line by taking the current faulty line as a boundary to generate a new sub-template, and performing no process on the standard template that is not influenced by the faulty line; and
step 6, performing the template match identification on the identification image information of the loaded paper medium by using the newly generated sub-template and the standard template that is not influenced by the faulty line to obtain an identification result, and ending the process.

5. The method for identifying the paper medium according to claim 4, wherein the step of detecting whether there is a faulty line in the original image in the step 3 comprises:
assuming that:
(1) a grayscale value matrix of a reflected image has $x_0$ columns and $y_0$ rows;
(2) a grayscale value at a position of the yth row and the xth column in the reflected image is indicated by $g(x, y)$; and
(3) an average grayscale value of the xth column in the reflected image is indicated by $\tilde{g}(x)$;
in accordance with a constraint condition of:

$$\begin{cases} g(x, y) < \varepsilon_1, (0 < y < y_0); \\ \bar{g}(x) < \varepsilon_2, (0 < y < y_0); \\ |\bar{g}(x-1) - \bar{g}(x)| > \varepsilon_3; \\ |\bar{g}(x+1) - \bar{g}(x)| > \varepsilon_4; \end{cases}$$

wherein, each of $\varepsilon_1$, $\varepsilon_2$, $\varepsilon_3$ and $\varepsilon_4$ is larger than 0, and is a preset threshold value, an automatic search and detection is performed on an image grayscale value matrix obtained by the image sensor; if the above constraint condition is met at a column of $x=n_0$, that is, the $n_0$th column in the image grayscale value matrix, it is determined that there is a faulty line in the image; else, it is determined that there is no faulty line in the image.

6. The method for identifying the paper medium according to claim 4, wherein the step of determining the position of the faulty line in the coordinate system xOy in the step 3 comprises:

assuming that in a complete image of the paper medium, an upper left vertex is set as A, a lower left vertex is set as B, an upper right vertex is set as D and a lower right vertex is set as C, and the faulty line intersects with an upper boundary and a lower boundary of the complete image of the paper medium at points E and F respectively, upper, lower, left and right boundary points of the complete image of the paper medium are detected, and a linear fit is performed for each of the obtained boundary points to obtain:

an upper boundary linear equation of: $a_1x+b_1y+c_1=0$,
a lower boundary linear equation of: $a_2x+b_2y+c_2=0$,
a left boundary linear equation of: $a_3x+b_3y+c_3=0$, and
a right boundary linear equation of: $a_4x+b_4y+c_4=0$;
by solving:

$$\begin{cases} a_1x+b_1y+c_1=0 \\ a_3x+b_3y+c_3=0 \end{cases},$$

a coordinate of the upper left vertex A in the coordinate system xOy is obtained, which is indicated by $A(x_a, y_a)$;
by solving:

$$\begin{cases} a_2x+b_2y+c_2=0 \\ a_3x+b_3y+c_3=0 \end{cases},$$

a coordinate of the lower left vertex B in the coordinate system xOy is obtained, which is indicated by $B(x_b, y_b)$; and by solving:

$$\begin{cases} a_1x+b_1y+c_1=0 \\ x=n_0 \end{cases} \text{ and } \begin{cases} a_2x+b_2y+c_2=0 \\ x=n_0 \end{cases},$$

coordinates of the points E and F in the coordinate system xOy is obtained, which are indicated by $E(x_e, y_e)$ and $F(x_f, y_f)$ respectively,
resulting that:

$d_{AB}=\sqrt{(y_b-y_a)^2+(x_b-x_a)^2}$, $d_{AE}=\sqrt{(y_e-y_a)^2+(x_e-x_a)^2}$, and $d_{BF}=\sqrt{(y_f-y_b)^2+(x_f-x_b)^2}$.

7. The method for identifying the paper medium according to claim 6, wherein the step of determining the position of the faulty line in the coordinate system x'O'y' in the step 5 comprises:

the coordinate system x'O'y' is established by taking the upper left vertex A as an origin, taking an extension direction of the upper boundary as the x axis, and taking an extension direction of the left boundary as the Y axis, and the coordinates of the points A, E and F are respectively:

$O'=A=(0,0)$, $E=(d_{AE},0)$, and $F=(d_{BF},d_{AB})$;

and the linear equation of the faulty line EF in the coordinate system x'O'y' is:

$$y' = \frac{d_{AB}}{d_{BF}-d_{AE}}x' + \frac{d_{AB} \cdot d_{AE}}{d_{AE}-d_{BF}}.$$

* * * * *